July 10, 1962  M. ZWARYCZ  3,043,476
FEED MECHANISM FOR THIN FLAT COMESTIBLES
Filed May 13, 1959  2 Sheets-Sheet 2
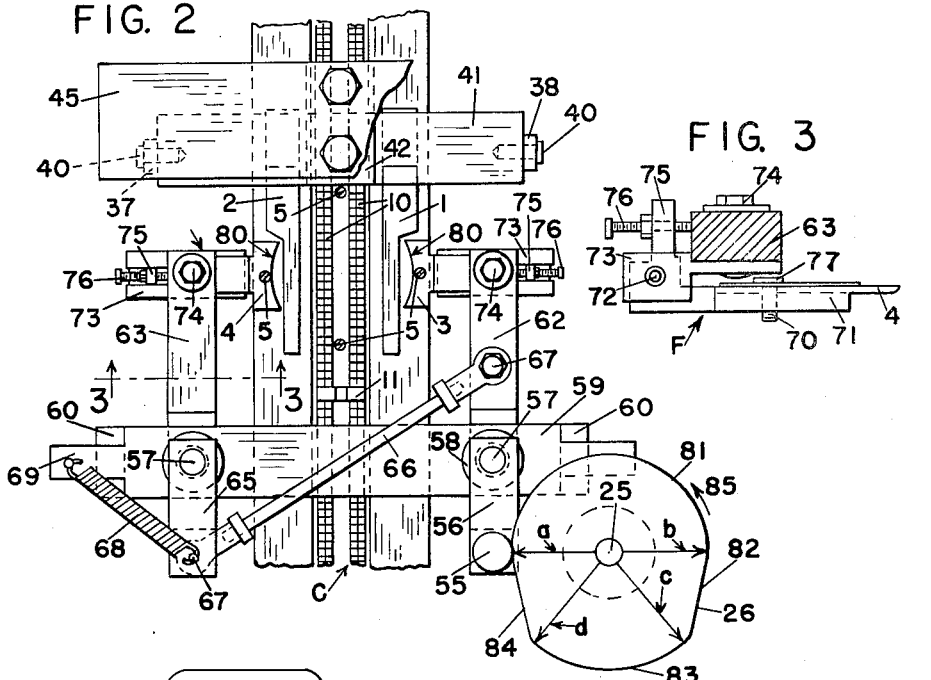
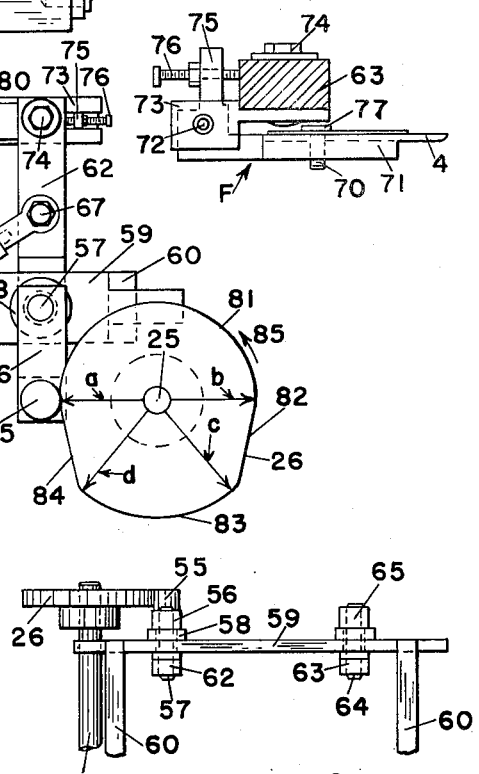
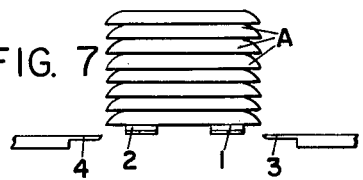
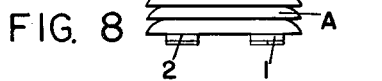
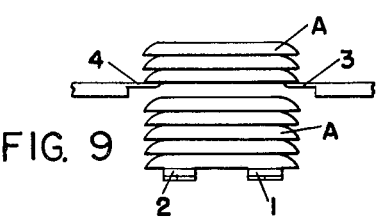
INVENTOR
MICHAEL ZWARYCZ
Charles T. Hurley
ATTORNEY 3,043,476
FEED MECHANISM FOR THIN FLAT COMESTIBLES
Michael Zwarycz, Wilbraham, Mass., assignor to Crompton & Knowles Packaging Corporation, Holyoke, Mass., a corporation of Massachusetts
Filed May 13, 1959, Ser. No. 812,929
1 Claim. (Cl. 221—221)

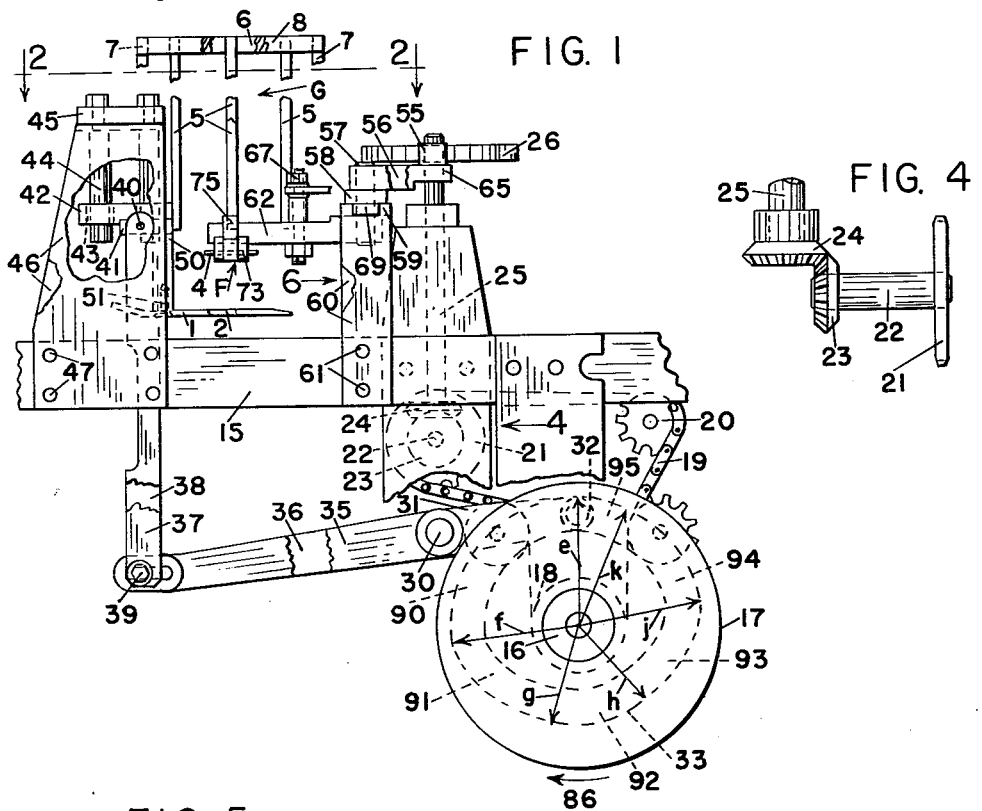

This invention relates to improvements in machines for feeding flat thin articles of food such as cookies from a stack to a discharge station.

In the wrapping of certain articles of food, such as oatmeal cookies, molasses cookies, etc., it is customary to provide a vertical guide stack down which the articles feed by gravity toward a control position from which a given number of articles are separated from the bottom of the stack and lowered to a discharge station for transport to a wrapping machine. As heretofore made, such machines have employed a support means which, when moving to supporting position, could damage an article of more than standard thickness. It is to be understood that such articles as those already mentioned are subjected to a baking process in which uniform thickness cannot always be attained.

It is an important object of the present invention to provide means which will take into consideration the possibility that food articles will be of different thicknesses but will nevertheless be able to deliver a selected number of articles without damaging them.

It is a further object of the invention to provide support fingers which can be moved inwardly from opposite sides of a stack mounted in a manner which permits them to have a slight upward motion from a normally down position in the event they should engage an article which is slightly higher or thicker than it should be.

It is another object of the invention to provide means for supporting the desired number of articles selected from the bottom of the stack and lower them to a discharge position where they can be transferred to a conveyor.

It is a further object of the invention to provide support means, such as a pair of forks, disposed on opposite sides of the conveyor means, movable to three different vertical positions in the highest of which the support means holds all of the superposed articles above release fingers which at the time are withdrawn to nonsupporting position. The fork means then descends to a given intermediate low position, whereupon the fingers move in, after which the support means moves additionally in a downward direction to its lowest position or discharge station. The additional down motion of the support means must be large enough to permit the support fingers to fall back to their normal position should they have been raised by an article and also lower the selected articles far enough to permit them to clear the lowest of the articles which are supported by the fingers.

In order that the invention may be clearly understood reference is made to the accompanying drawings which illustrate by way of example the embodiments of the invention and in which:

FIGURE 1 is a side elevation of part of the machine having the invention applied thereto, FIGURE 2 is a horizontal section on line 2—2, FIG. 1, FIGURE 3 is an enlarged detail section on line 3—3, FIG. 2, FIGURE 4 is a detail elevation looking in the direction of arrow 4, FIGURE 1, FIGURE 5 is a diagram indicating the motions of the fingers and support means for a complete cycle of the machine, FIGURE 6 is a detail elevation looking in the direction of arrow 6, FIG. 1, and FIGURES 7, 8 and 9 are diagrammatic views showing the invention in different steps of operation.

In order that the details of the machine to be described hereinafter may be more fully understood reference will first be had to FIGS. 7–9 to indicate the general purpose of the mechanism and the motions of the supports and fingers.

In FIG. 7 right and left-hand supporting forks 1 and 2 are shown in their highest position supporting a number of superposed articles of food designated at A. Right and left-hand fingers 3 and 4 are withdrawn to their nonsupporting position and the forks 1 and 2 will be slightly higher than the fingers to permit the latter to be withdrawn from under the stack upon completion of the previous cycle of operation.

The articles A are arranged in guide means shown in FIGS. 1 and 2, this means including in the present instance four rods 5 attached at their upper ends to the inside of a ring holder 6 which is supported by uprights 7, the upper ends of which are shown in FIG. 1. These uprights may be supported in any approved manner by the machine and are fixed to it and the ring 6 is shown as an example of means which permit the insertion of articles of food through a hole 8 in the ring. It is to be understood that the guide means set forth herein and designated generally at G is only one form of several guides which may be used for guiding the food articles as they descend by gravity.

FIG. 8 shows the supporting forks 1 and 2 as having moved to a given intermediate low position and the fingers 3 and 4 are shown in dotted lines as they move inwardly toward the stack after the forks have reached their intermediate position. To illustrate the invention it is assumed that the topmost article of the five resting on the supports 1 and 2 are designated at A' is slightly higher than it would be if all the articles of food were of the same uniform thickness and as the fingers move inwardly towards the center of the stack they are limitedly cammed upwardly to the full line position toward the next article thereabove by engagement with article A'. As will be noted in FIG. 8, fingers 3 and 4, when moving from the dotted to the full line positions, do not lift the articles A but merely move upwardly, in a sense by vertical self-adjustment, to engage the under side of the lowest of articles A.

After the fingers have moved to a position in which they can support the superposed articles the supports 1 and 2 have an additional downward motion to their lowest position which permits the fingers to move back down from their temporarily elevated position shown in full lines in FIG. 8 to the position shown in FIG. 9. This additional motion not only permits the fingers to be restored to their normal low position but also enables the articles supported directly by the forks 1 and 2, shown herein as five in number, to be in a discharge station or position low enough so that they can be moved off the supporting forks without contacting the lowest article in the stack still supported by the fingers.

Between the two forks 1 and 2 there is located a conveyor mechanism C shown herein as having two conveyor chains 10 which move down as viewed in FIG. 2 and are joined at spaced intervals along their length by article pushers 11 which move between the supports 1 and 2 to remove the selected five articles off the forks and advance them to a wrapping machine (not shown). Only one pusher is shown herein.

The mechanisms for performing the operations described with reference to FIGS. 7–9 include a fixed frame 15, see FIGS. 1 and 2, on which is rotatably mounted a driving shaft 16 to which is secured a vertically disposed cam 17. Also fixed to shaft 16 is a sprocket wheel 18 which meshes with a driving chain 19 trained over an idler sprocket 20 and also over a driven sprocket 21 secured to a shaft 22 also rotatably mounted on frame 15. The shaft 22 has secured thereto a mitre gear 23 which meshes with an equal mitre gear 24, see FIG. 4, on the lower end of a vertical shaft 25 to the upper end of which is secured a second cam 26. The shaft 16 is rotated in any approved manner by a power source (not shown) and since the sprockets 18 and 21 are the same size and the mitre gears 23 and 24 are also the same size, the cams 17 and 26 will each make a complete rotation for each cycle of operation of the machine. Shaft 25 is suitably journaled on frame 15.

The lifting and lowering mechanism for the previously mentioned forks 1 and 2 includes a rockable shaft 30 mounted for rotation on the frame of the machine and having secured thereto an arm 31 provided with a roll 32 which is received by a cam groove 33 in one of the vertical faces of the cam 17. Secured to the shaft 30 are two similar arms 35 and 36 which are connected respectively to upwardly extending links 37 and 38 the lower ends of which have pivotal connections 39 with their respective arms.

The upper ends of the links 37 and 38 are pivotally connected at 40 with a carrier 41 the upper part of which has secured thereto a block 42 provided with vertical holes 43 to receive fixed vertical guide rods 44. The latter have their upper ends secured to a cross bar 45 held in fixed position by uprights 46 secured at 47 at their lower ends to the frame 15. The carrier 41 is provided with depending bars 50, one for each of the forks 1 and 2, each fork being held to its bar by a screw 51. By reason of the rods 44 the forks have right line vertical movements.

As cam 17 rotates it will oscillate the arm 31 which in turn will give the carrier 41 rising and descending motions to impart to the support means or forks 1 and 2 the kinds of motions already set forth in connection with FIGS. 7-9.

The cam 26 is of the face type and engages a roll 55 on an arm 56 secured to a short upright shaft 57 rockable in a bearing 58 on a stationary cross bar 59 which derives its support from uprights 60 secured at 61 to the frame 15. Below the bearing 58 the shaft 57 has secured thereto a horizontal arm 62 located at the right of conveyor chains 10 as viewed in FIG. 2. A similar horizontal arm 63 at the left of chains 10 as viewed in FIG. 2 is secured to a vertical stud 64 rockable on cross bar 59 and having secured thereto a forwardly extending arm 65. Both arms 62 and 63 move in a substantially horizontal plane due to the action of cam 26. The latter arm and the arm 62 are connected by a diagonal cross tie rod 66 the ends of which are pivotally connected at 67 to arm 62 and 65 at equal distances from shafts 57 and 65, respectively. A spring 68 interposed between arm 65 and an extension 69 of bar 59 acts through the tie rod to hold the roll 55 against the cam 26. The tie rod 66 acts to simultaneously move the arms 62 and 63 in opposite directions, first toward and then away from the articles. Both arms 62 and 63 move in a substantially horizontal plane due to the action of cam 26.

The free upper ends of the arms 62 and 63 as viewed in FIG. 2 are each provided with a support finger and since the fingers are alike except that they are of opposite hands only one of them will be described, namely, the one mounted on arm 63 as shown in FIG. 3 and designated generally at F. The cam 26, the arms 56, 62, 63 and 65 together with the spring 68 may be considered to be actuating means for the finger mechanisms F.

Referring particularly to FIG. 3, which shows one of the finger mechanisms, it will be seen that finger 4 is secured by a screw 70 to lever 71 which is pivoted at 72 to a small bearing 73 secured by bolt 74 to the underside of arm 63. The lever 71 has an upwardly extending arm 75 in which is mounted an adjustable stop screw 76 for engagement with the arm 63. The screw 70 has a head 77 located a short distance under the bearing 73 so that the lever 71 is capable of a slight upward motion at its right-hand end as viewed in FIG. 3 around its axis 72 and with respect to the arm 63. It is this feature of the mechanism which enables the fingers to move upwardly in a perpendicular direction with respect to the plane through which they move and from their normal down position to their raised full line position already mentioned in connection with FIG. 8.

The fingers are provided with arcuate edges 80 to conform more or less to the circular form of the food articles which are handled by the machine, and they tend by their weight to return to normal down position.

The cam 26 turns counterclockwise as viewed in FIG. 2, see arrow 85, and has a low dwell 81 between radii $a$ and $b$, reading clockwise, corresponding to the in or article supporting position of the fingers, an incline 82 between radii $b$ and $c$ which effects out motion of the fingers to nonsupporting positoin, a high dwell 83 between radii $c$ and $d$ which keeps the fingers out, and a decline 84 between radii $d$ and $a$ which effects in motion of the fingers.

Cam 17 turns clockwise as viewed in FIG. 1, see arrow 86, and has a high dwell 90 between radii $e$ and $f$, reading counterclockwise, corresponding to the lowest position of the forks, as shown in FIG. 1, a decline 91 between radii $f$ and $g$ which raises the forks to their high position, a short low dwell 92 between radii $g$ and $h$ which keeps the forks high while the fingers move out, an incline 93 between radii $h$ and $j$ which effects down motion of the forks to their intermediate low position, an intermediate dwell 94 between radii $j$ and $k$ to hold the forks in their intermediate given low position while the fingers move in, and a short incline 95 between radii $k$ and $e$ providing the previously mentioned additional down motion of the forks to their lowest position.

FIG. 5 shows the motions and positions of the fingers and forks for a complete 360° cycle of operation of the machine. The upper dash line 100 corresponds to the fingers, the low part of the line representing the in or supporting position of the finger and the high part corresponding to the out or nonsupporting position. The lower solid line 101 corresponds to the forks and by its vertical position indicates the vertical positions of the forks. The zero angular position at the left of FIG. 5 corresponds to the starting position with the parts in the position shown in FIG. 2. The lines 100 and 101 are derived from the parts of the cams 17 and 26 described by reference to the various radii and further description of them is not thought to be necessary.

Having now particularly described and ascertained the nature of the invention and in what manner the same is to be performed, what is claimed is:

In a machine provided with guide means for gravity feeding of superposed flat thin fragile articles of food of slightly different thicknesses and operating with vertically movable support means moving from a high position adjacent to the bottom of the guide means down to a given intermediate low position and thereafter having an additional down motion to lowest position, said machine being provided with a pivoted pair of horizontal arms at opposite sides of the guide means movable in a horizontal plane toward and away from the articles, a pair of support fingers, one for each arm, for engagement with the articles on opposite sides thereof and mounted on the arms for relative movement thereto in a direction perpendicular to said horizontal plane, means on each of said arms to pivotally support the fingers for slight upward motion with respect to said arms upon engagement of an article by said fingers when the latter are moving to supporting position, and single cam means operatively connected to one of said arms to cause movement of both arms in said plane toward said articles to effect said slight upward motion when the vertically movable support means is in said given intermediate low position, said horizontal arms being interconnected by a cross tie rod to effect simultaneous movement of the arms in opposite directions, first toward and then away from the articles when said one of said arms is actuated by said cam means.

References Cited in the file of this patent
UNITED STATES PATENTS

| | | |
|---|---|---|
| 1,330,639 | Leumann | Feb. 10, 1920 |
| 1,489,892 | Loughridge | Apr. 8, 1924 |
| 2,385,267 | Franz | Sept. 18, 1945 |
| 2,594,241 | Williamson | Apr. 22, 1952 |
| 2,954,881 | Hopton | Oct. 4, 1960 |